United States Patent [19]
Dennis et al.

[11] Patent Number: 5,315,675
[45] Date of Patent: May 24, 1994

[54] OPTICAL TAP HAVING A V-SHAPED RECESS WITHIN THE RANGE OF FROM 152° TO 179°

[75] Inventors: Simon M. Dennis; Philip R. Steward; Roland W. Downing; Simon M. James; David A. Ferguson; Dominik Drouet, all of Suffolk, England

[73] Assignee: British Telecommunications Public Limited Company, London, England

[21] Appl. No.: 989,012

[22] PCT Filed: Jul. 17, 1991

[86] PCT No.: PCT/GB91/01184

§ 371 Date: Mar. 12, 1993

§ 102(e) Date: Mar. 12, 1993

[87] PCT Pub. No.: WO92/01961

PCT Pub. Date: Feb. 6, 1992

[30] Foreign Application Priority Data

Jul. 20, 1990 [GB] United Kingdom ............... 9015992

[51] Int. Cl.⁵ .................................................. G02B 6/26
[52] U.S. Cl. ............................................. 385/32; 385/48
[58] Field of Search .......................... 385/32, 48, 27, 29, 385/31

[56] References Cited

U.S. PATENT DOCUMENTS

| 4,802,723 | 2/1989 | Miller | 385/32 |
| 4,824,199 | 4/1989 | Uken | 385/32 |
| 4,834,482 | 5/1989 | Campbell et al. | 385/32 |
| 5,037,170 | 8/1991 | Uken et al. | 385/32 |
| 5,039,188 | 8/1991 | Williams | 385/32 |
| 5,090,792 | 2/1992 | Koht et al. | 385/32 |
| 5,193,132 | 3/1993 | Uken et al. | 385/32 |

FOREIGN PATENT DOCUMENTS

| 0325382 | 7/1989 | European Pat. Off. | G01M 11/00 |
| 2541466 | 8/1984 | France | G02B 7/26 |
| 63-149608 | 6/1988 | Japan | 385/32 |
| 63-149610 | 6/1988 | Japan | 385/32 |
| 63-173007 | 7/1988 | Japan | G02B 6/28 |
| 1-234805 | 9/1989 | Japan | 385/32 |
| 2158607A | 11/1985 | United Kingdom | G02B 6/26 |
| 2162336A | 1/1986 | United Kingdom | G02B 6/42 |
| WO88/07689 | 10/1988 | World Int. Prop. O. | |
| WO90/00260 | 1/1990 | World Int. Prop. O. | G02B 6/42 |

*Primary Examiner*—Frank Gonzalez
*Attorney, Agent, or Firm*—Nixon & Vanderhye

[57] ABSTRACT

An optical tap comprises a transparent acrylic block (1) having a single V-shaped recess (2) into which an optical fibre (3) is urged by a member (4). The resulting kink in the fibre (3) enables light to couple between the core of the fibre and the block (1) from what is substantially a point source defined by a tight curve of short arcuate length at the kink.

20 Claims, 3 Drawing Sheets

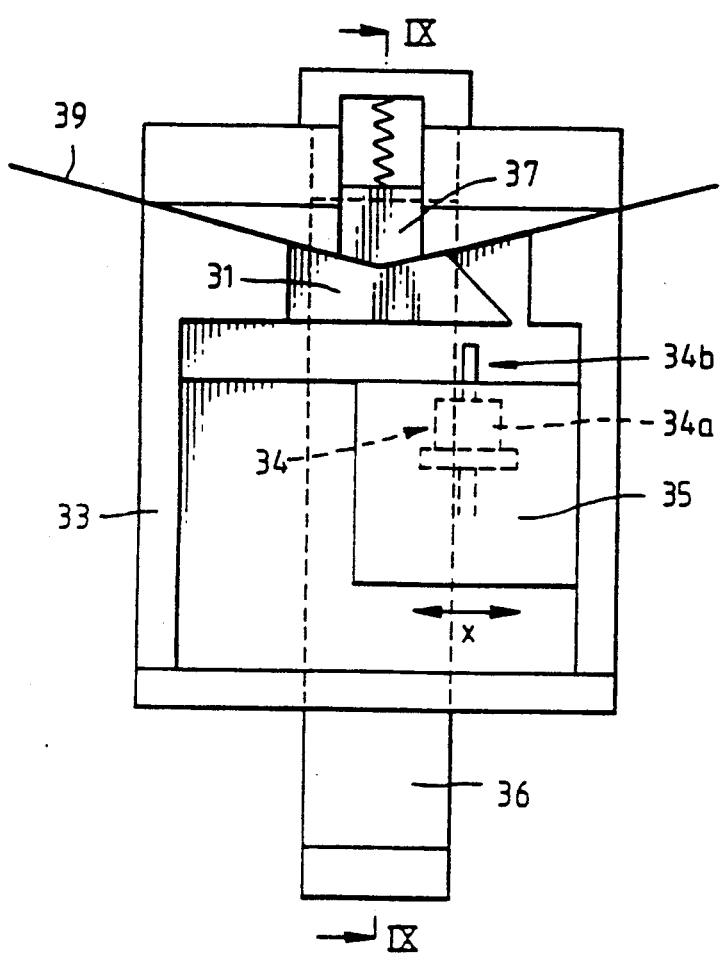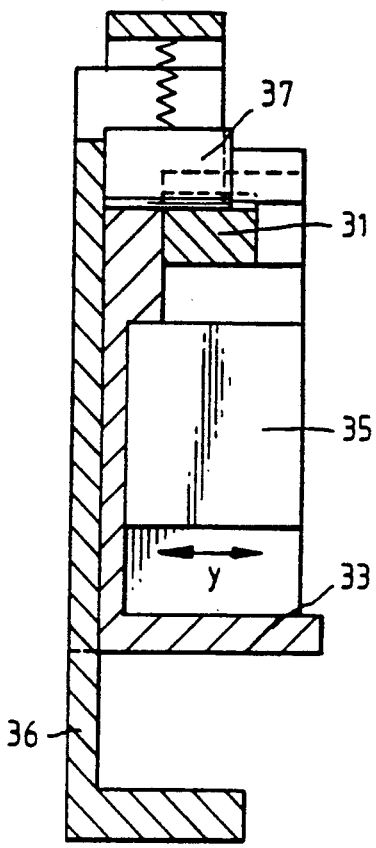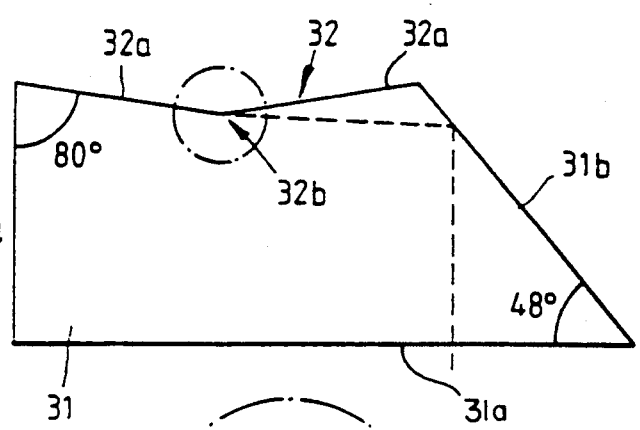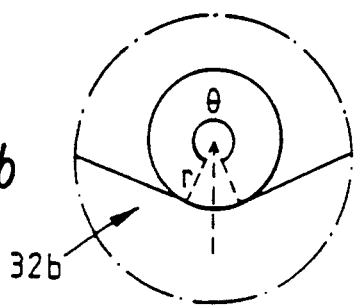

OPTICAL TAP HAVING A V-SHAPED RECESS WITHIN THE RANGE OF FROM 152° TO 179°

BACKGROUND OF THE INVENTION

1. Field of the Invention

This invention relates to an optical tap for coupling light into, or out of an optical fibre.

2. Related Art

In optical communications, the radiation used is not necessarily in the visible region of the electromagnetic spectrum, and so the words 'optical' and 'light' when used in this specification are not to be interpreted as implying any limitation to the visible spectrum. For example, the wavelengths preferred for transmission through silica optical fibres are in the infra red region, because the loss minima of silica fibres occur at 1.3 and 1.5 microns.

In many 'in field' situations, it is necessary for an engineer to sample the signals that are being transmitted along an optical fibre, or to transmit signals to, for example, a telephone exchange. This may be for maintenance or testing purposes, or so that the engineer can receive and transmit communications.

The specification of our published patent application WO88/07689 describes an optical tap that can be temporarily attached to an optical fibre, the fibre being bent, and the tap collecting light that couples out due to the local perturbation caused by the bend. With the arrangement described in that specification, the level of light that is coupled out exhibits a non-linear wavelength dependence. Moreover, a large proportion (98-99% of total core power), escapes from the core along optical paths nearly tangential to the fibre bend so this type of tap has a low coupling efficiency, and can only be used as an intrusive device. The reason for the high optical loss is that leakage occurs over the entire length of the bend, and continues for some distance afterwards, as fibre cladding modes formed by the presence of the bend eventually radiate out of the fibre.

SUMMARY OF THE INVENTION

The present invention provides optical tap apparatus for coupling light into, or out of, an optical fibre, the apparatus comprising an optical head having a V-shaped recess, and a member adapted to deform the optical fibre into the recess, the recess being shaped and sized to subject the optical fibre to a tight curve of short arcuate length when the fibre is deformed into the recess whereby light can be coupled into, or out of, the optical fibre at a punctiform region of its curved portion, wherein the angle at the apex of the V-shaped recess is within the range of from 152° to 179°.

The advantage of this type of optical tap is that light can enter or leave the optical fibre at a region which is substantially a point. Consequently, the tap has a much higher coupling efficiency than known optical taps which rely on coupling occurring over substantially the entire length of a fibre bend. In practice, the recess and the abutment member are sized and shaped to subject the optical fibre to a curve whose radius of curvature lies in the range of from 125 μm to 4 mm.

Advantageously, the optical head is a block made of transparent acrylic material, and the block is shaped so that a side surface thereof subjects light travelling towards, or away from, said punctiform region of the optical fibre to total internal reflection, whereby the light enters or leaves the block via a surface thereof which is generally parallel to the recessed surface.

Conveniently, the abutment member is constituted by a resilient protrusion provided on a mandrel. The resilient protrusion may be a generally hemispherical member whose radius is 3 mm and which is made of soft rubber.

In a preferred embodiment, the apparatus is such that the abutment member applies, in use, a pressure lying within the range of from 60 g to 500 g to the optical fibre. Conveniently, the recess has a width of 20 mm, and a depth within the range of from 0.1 to 2.5 mm. Preferably, the recess has a rounded cross-section, the radius of curvature of which lies within the range of from 2 mm to 3 mm.

In a preferred embodiment, the apparatus further comprises a detector for detecting light which is coupled from the optical fibre into the optical head. The detector may be a large area detector, or it may have a small active area. In the latter case, the apparatus may further comprise a graded refractive index lens positioned between the optical head and the detector. In either case a filter may be positioned between the optical head and the detector.

Alternatively, the apparatus further comprises a light source for injecting light into the optical fibre via the optical head. Conveniently, the light source is a laser subassembly constituted by a diode laser and a graded refractive index lens.

The invention also provides a method of coupling light into, or out of, an optical fibre, the method comprising the steps of urging the optical fibre into a recess formed in an optical head, the recess being shaped and sized to subject the optical fibre to a tight curve of short arcuate length when the fibre is deformed into the recess, and retaining the fibre in the recess so that light from the fibre is coupled into, or out of, optical fibre at a punctiform region of its curved portion.

BRIEF DESCRIPTION OF THE DRAWINGS

Four forms of optical tap, each of which is constructed in accordance with the invention, will now be described by way of example, with reference to the accompanying drawings, in which:

FIG. 8 is a schematic front elevation of the fourth form of optical tap in the engaged position;

FIG. 9 is a cross-section taken on the line IX—IX of FIG. 8; and

FIGS. 10a and 10b provide a schematic representation, on an enlarged scale, of the optical head of the fourth form of optical tap.

DETAILED DESCRIPTION OF EXEMPLARY EMBODIMENTS

Figure 1:
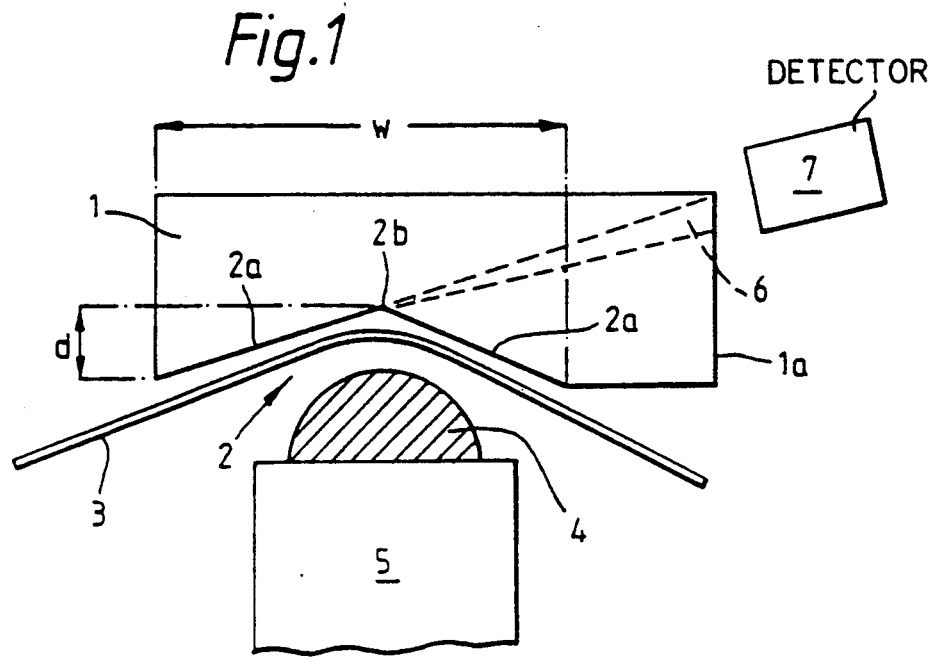
FIG. 1 is a schematic representation of the first form of optical tap.

Referring to the drawings, FIG. 1 shows an optical tap including an optical head 1, constituted by a block made of transparent acrylic plastics material. The optical head 1 is formed with a shallow, V-shaped recess 2 defined by inwardly-inclined surfaces 2a. The surfaces 2a meet at a point 2b and define an angle of 174°. The recess 2 has a depth d=0.5 mm and a width w=20 mm. The optical head 1 has a 3×3 mm cross-section.

In use, an optical fibre 3 is urged into the recess 2 by means of a resilient buffer 4 carried by a mandrel 5. The buffer 4 is made of soft rubber, and is generally hemispherical with a radius of 3 mm. When the optical fibre 3 is positioned in the recess 2, the point 2b subjects the fibre to a very tight bend of short arcuate length (a kink). This causes light carried by the fibre 3 to leak from the fibre over a very small region thereof in the vicinity of the point 2b. Light is, therefore, tapped out of the fibre 3 from practically a point source, and then travels through the optical head 1 in a narrow, but slightly diverging beam 6. This light is detected by a large area photodetector 7. The photodetector 7 is positioned adjacent to that end face 1a of the optical head 1 at which the beam 6 emerges, this end face being 5 mm from the adjacent edge of the recess 2.

The dimensions of the recess 2 are chosen to give the required insertion loss for a given fibre signal. Thus, with the dimensions quoted above, the optical tap has an insertion loss of 2 dB at 1550 nm for the most bend sensitive fibre. This order of loss enables the tap to be used in a non-intrusive manner, that is to say the insertion loss is within the operating margin of the optical system of which the fibre is part, so that the tapping process does not affect the signals or data carried by the fibre.

Figure 2:
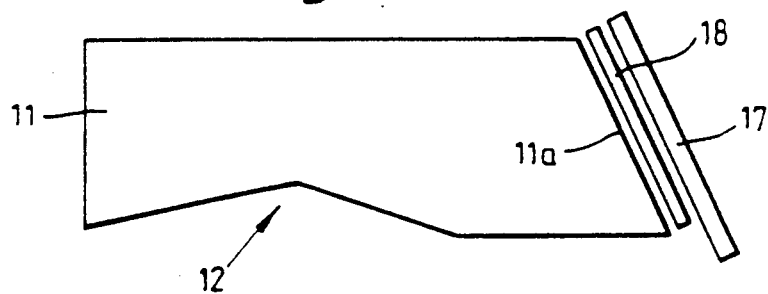
FIG. 2 is a schematic representation of the second form of optical tap.

Because this type of optical tap can be used in a non-intrusive manner, it is suitable for incorporation in a non-intrusive optical power meter, and FIG. 2 shows an optical tap which is modified for this purpose. This optical tap includes an optical head 11 is constituted by a block of transparent acrylic plastics material. The optical head 11 is formed with a shallow V-shaped recess 12, the dimensions of the head and recess being identical with those of the optical head 1 and the recess 2 of the optical tap of FIG. 1. The optical head 11 is, however, modified by having its end face 11a inclined at an angle of 5.7°, this angle being chosen so that the beam of light (not shown)—which in use leaks out of an optical fibre (not shown) positioned within the recess 12 in such a manner that a kink is formed in the fibre—is perpendicularly incident upon this end face. This light beam is detected by a chip-carrier germanium detector 17, an optical filter 18 being sandwiched between the end face 11a and the detector. The filter 18 is a 1575 nm band pass multi-layer filter formed on a 100 micron silicon wafer. The detector 17 is encapsulated in epoxy resin, thereby providing hermetic sealing and mechanical integrity.

The use of the chip-carrier detector 17 makes the optical tap more compact, and so facilitates the construction of a small, hand-held optical power meter. The filter 18, being positioned at right-angles to the light beam, has a response which is not spectrally shifted. The optical performance of the tap of FIG. 2 is similar to that of the tap of FIG. 1, having an insertion loss of 2 dB at 1550 nm. The power meter is designed for use in a Telephony/Broadband Passive Optical Network (TPON/BPON) system which carries traffic at two wavelengths—nominally TPON at 1300 nm and BPON at 1525 nm. This system also carries test signals at a wavelength of 1575 nm, the power meter being designed for measuring these test signals. It is for this reason that the optical filter 18 is a band pass filter rated at 1575 nm, whereby any traffic signals at 1300 nm or 1525 nm are filtered out before they reach the detector 17.

Figure 3:
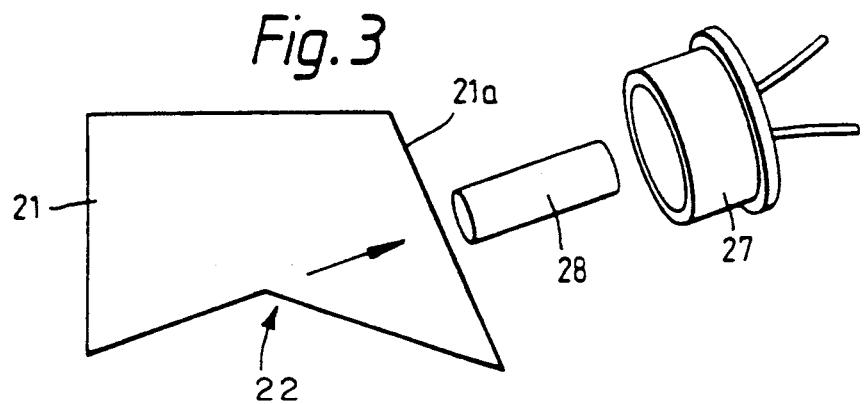
FIG. 3 is a schematic representation of the third form of optical tap.

FIG. 3 shows another modified form of optical tap, this including an optical head 21 constituted by a block of transparent acrylic material. The optical head 21 is formed with a V-shaped recess 22, the recess having the same dimensions as the recesses 2 and 12. The optical head 21 has similar dimensions to the optical head 11, but its inclined end face 21a is aligned with the adjacent edge of the recess 22. Light, which is tapped out of an optical fibre (not shown) positioned within the recess 22 in such a manner that a kink is formed in the fibre, is detected by a small, active area detector 27, a graded refractive index (GRIN) lens 28 being positioned between the end face 21a and the detector. The GRIN lens 28 has a high light collection efficiency, which enables the use of the small, active area detector 27. This, in turn, permits the optical tap to be used for tapping high bit rate (2 Megabit/s) signals. This version of optical tap can, therefore, be used as a sensitive, high speed data receiver.

Although not shown in FIGS. 2 and 3, each of the optical taps shown in these figures includes a mandrel and a buffer (which are similar to the mandrel 5 and the buffer 4 of the FIG. 1 embodiment) for urging optical fibres into the recesses 12 and 22 of their optical heads 11 and 21.

FIGS. 4 to 10b show a fourth form of optical tap, this tap being adapted to tap light into an optical fibre. It is, therefore, a launch device. This tap includes an optical head 31 constituted by a block of transparent acrylic material, the block being formed with a V-shaped recess 32 defined by inwardly-inclined surfaces 32a. The surfaces 32a meet at a rounded V-shaped portion 32b (see FIG. 10b), the surfaces defining an included angle $\theta$ of 160°, and the radius of curvature r of the rounded portion being 2 mm. The recess 32 has a depth of 0.5 mm and a width of 20 mm.

The optical head 31 is mounted on a housing 33 adjacent to a laser sub-assembly 34. The laser sub-assembly 34 is constituted by a diode laser 34a and a graded index fibre (GRIN) lens 34b positioned so as to focus the light emitted by the laser onto the rounded V-shaped portion 32b of the optical head 31 in a manner described below. The laser 34a and the GRIN lens 34b are mounted on an x-y positioner 35 so as to allow fine adjustment of their positions in the two direction indicated in FIGS. 4 and 5 by the double-headed arrows x and y. This allows the device to be set up for optimum launch efficiency prior to use.

A spring-loaded slide 36 is mounted in the housing 33, the slide carrying a mandrel 37 which is profiled to complement the shape of the recess 32 in the region of the rounded portion 32b. A guard piece 38 (see FIG. 7), which forms part of the housing 33, is positioned adjacent to the optical head 31, the guard piece being formed with a slot 38a for receiving an optical fibre 39.

Figures 4, 5:
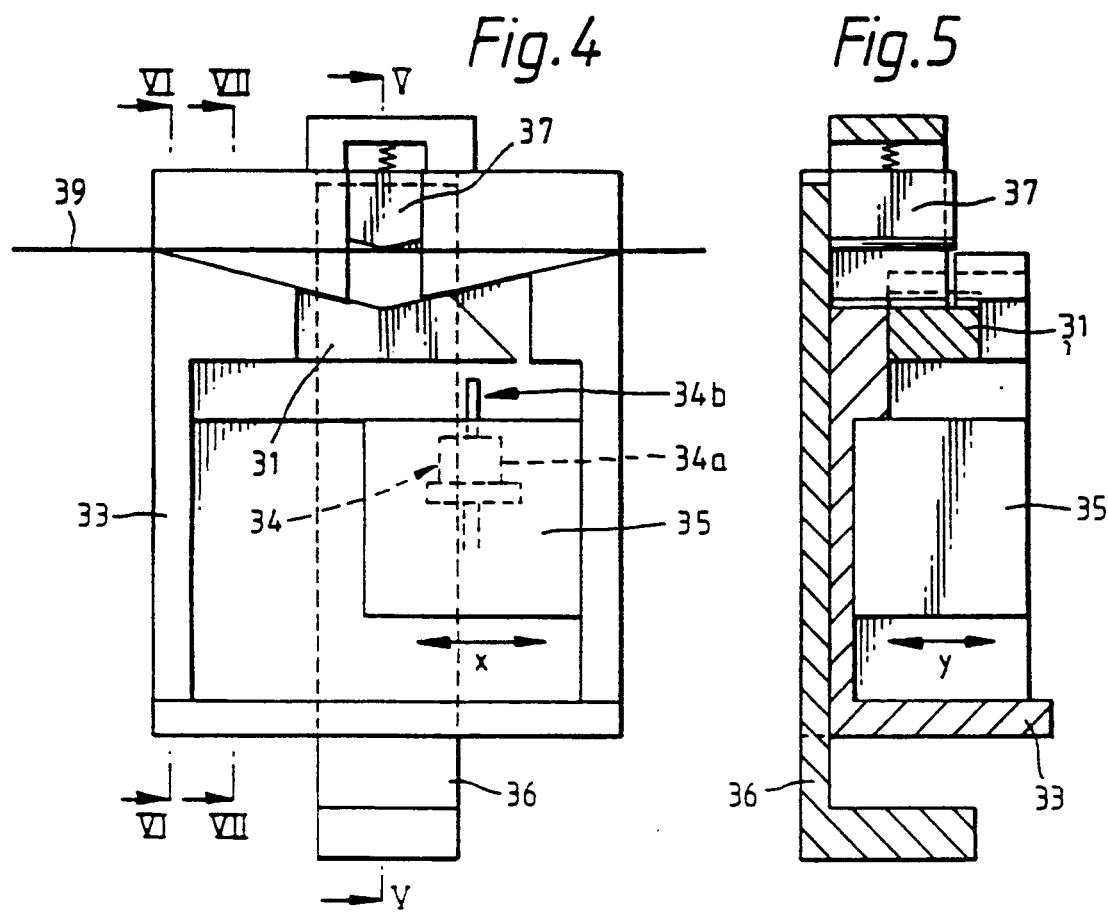
FIG. 4 is a schematic front elevation of the fourth form of optical tap in the disengaged position.
FIG. 5 is a cross-section taken on the lines V—V of FIG. 4.
Figures 6, 7:
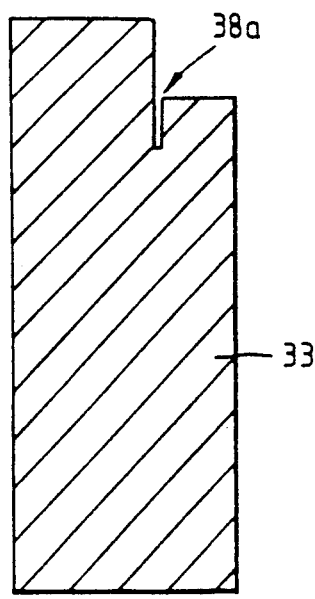
FIG. 6 is a cross-section taken on the line VI—VI of FIG. 4.
FIG. 7 is a cross-section taken on the line VII—VII of FIG. 4.

In use, the slide 36 is first pushed in to open up a gap between the guard piece 38 and the mandrel 37 (see FIG. 5). This enables the optical fibre 39 to be inserted between the mandrel 37 and the optical head 31. The slide 36 is then released, and the fibre 39 is urged by the mandrel 37, which is carried downwardly (as shown in the figures) by the spring-biassed slide 36, into the slot 38a until it is forced into contact with rounded portion 32b of the optical head 31. This ensures that the optical fibre 39 is accurately located in the proper position on the optical head 31, where it is held in close contact by the matching profiles of the rounded portion 32b and the mandrel 37. At this stage, the laser 34a may be turned on (if desired, this can be done automatically by a micro-switch—not shown—actuated by the slide 36), and light launched into the fibre 39. To release the fibre 39, the slide 36 is pushed in again to open up the gap between the mandrel 37 and the optical head 31, thereby allowing the fibre to be withdrawn.

When the optical fibre 39 is positioned in the recess 32 by the mandrel 37, the rounded portion 32b subjects the fibre to a tight bend of short arcuate length (a kink). Thus, light which is directed towards this kinked portion of the fibre 39 will be tapped into the fibre over a very small region. As shown in FIG. 10, a light beam 40 from the laser 34a (not shown in this figure) enters the optical head 31 via the surface 31a thereof which is opposite the recess 32. This light beam 40 is directed towards the kinked portion of the fibre by total internal reflection from an angled side surface 31b of the optical head 31. In order to ensure that the light beam 40 is accurately focused onto the kinked portion of the fibre 39, the surfaces 31a and 31b are angled at 48°.

One of the advantages of the single kink optical taps described above with reference to FIGS. 1 to 10b is that they are relatively insensitive to fibre specification, the tapping level depending primarily on the geometry of the recesses 2, 12, 22 and 32, and the pressure applied by the associated buffer/mandrel. The preferred pressure range is from 60 to 500 g. The critical parameter of each of the recesses 2, 12, 22 and 32 is the angle at the apex of the kink, the useful range of this angle being 152° to 179°. For recesses of width 20 mm, this angular range corresponds to a recess depth range of 0.1 to 2.5 mm. The criterion for defining the maximum recess size (smallest kink angle) arises from the dependence of insertion loss on wavelength. The ideal wavelength dependence would be linear and flat over the wavelength range of 1200 nm to 1600 nm. This linearity breaks down as the kink angle approaches 152°, so this would seem to indicate the useful limit for the kink angle, at least when the tap is used in a power meter. The criterion for defining the minimum recess size (largest kink angle) is less clear, but it does seem to depend upon the minimum acceptable insertion loss. As a useful ultra-low insertion loss tap can be designed with a depth of 0.1 mm for a recess width of 20 mm, this leads to the upper limit of 179° for the kink angle. In practice, the dimensions of the recess are tailored to give the required insertion loss to the fibre signal (for example to tap out a predetermined proportion of the light passing along the fibre). If the recess angle is too small, too sharp a kink would be formed in the fibre, and this could lead to undesirable fibre glass/coating damage.

It will be apparent that optical taps of the type described above have many other uses. For example this type of optical tap could be used for fibre identification on a live system. In this case, a low level amplitude modulation (constituting a system/fibre label) would be introduced on top of the high bit rate system data (which is produced by direct modulation of the bias applied to the transmitting laser). The optical tap would be used to access the fibre in the field by non-intrusively tapping of the signal. The system/fibre label would then be picked off using a low pass filter, thereby providing fibre identification in the field.

It will be apparent that modifications could be made to the optical taps described above. In particular, the block could be made of glass instead of transparent acrylic material. Moreover, where the optical tap forms part of an optical power meter, the filter could be rated for TPON or BPON signals. In the former case, a low pass filter rated at 1300 nm could be used, and in the latter case a high pass filter rated at 1500 nm could be used. It would also be possible to construct an optical power meter incorporating an optical tap which does not incorporate a filter.

We claim:

1. Optical tap apparatus for coupling light including a range of wavelengths into, or out of, an optical fibre substantially independent of wavelength, the apparatus comprising:
   an optical head having a V-shaped recess, and
   an abutment member disposed for movement towards and away from the apex of said V-shaped recess to deform the optical fibre into the apex of said recess,
   the recess being shaped and sized to subject the optical fibre to a tight curve of short arcuate length when the fibre is deformed into the recess whereby light over a range of wavelengths can be coupled into, or out of, the optical fibre at a punctiform region of its curved portion, wherein the angle at the apex of the V-shaped recess is within the range of from 152° to 179° to provide coupling that is substantially independent of wavelength.

2. Apparatus as in claim 1, wherein the recess and the abutment member are shaped and sized to subject the optical fibre to a curve, whose radius of curvature lies within the range of from 125 $\mu$m to 4 mm, when the fibre is deformed into the recess.

3. Apparatus as in claim 1, wherein the optical head is a block made of transparent acrylic material.

4. Apparatus as in claim 3, wherein the block includes a side surface thereof disposed at an angle that subjects light travelling towards, or away from, said punctiform region of the optical fibre to total internal reflection at said side surface, whereby light entering or leaving the block via a further surface generally parallel to the recessed surface is internally reflected by said side surface to or from said punctiform region.

5. Apparatus as in claim 1, wherein the abutment member includes a resilient protrusion disposed on a mandrel.

6. Apparatus as in claim 5, wherein the resilient protrusion is a generally hemispherical member having a radius of approximately 3 mm.

7. Apparatus as in claim 5, wherein the resilient protrusion includes soft rubber.

8. Apparatus as in claim 1, including means for applying via the abutment member, in use, a pressure lying within the range of from 60 g to 500 g to the optical fibre.

9. Apparatus as in claim 1, wherein the recess has a width of 20 mm, and a depth within the range of from 0.1 to 2.5 mm.

10. Apparatus as in claim 1, wherein the apex of the recess has a rounded cross-section.

11. Apparatus as in claim 10, wherein the radius of curvature of the rounded cross-section lies within the range of from 2 mm to 3 mm.

12. Apparatus as in claim 1, further comprising a detector for detecting light which is coupled from the optical fibre into the optical head.

13. Apparatus as in claim 12, wherein the detector is a large area detector.

14. Apparatus as in claim 12, wherein the detector has a small active area.

15. Apparatus as in claim 14, further comprising a graded refractive index lens positioned between the optical head and the detector.

16. Apparatus as in claim 12, further comprising a filter positioned between the optical head and the detector.

17. Apparatus as in claim 1, further comprising a light source for injecting light into the optical fibre via the optical head.

18. Apparatus as in claim 17, wherein the light source includes a laser sub-assembly having a diode laser and a graded refractive index lens.

19. An optical power meter incorporating optical tap apparatus as in claim 1.

20. An optical power meter as in claim 10 including a detector for detecting light which is coupled from the optical fibre into the optical head and a filter positioned between the optical head and the detector, wherein the filter is a band pass filter rated at 1575 nm.

* * * * *